Aug. 7, 1945. C. LYNN 2,381,297
VENTILATED ELECTROMAGNETIC DEVICE
Filed Nov. 18, 1942
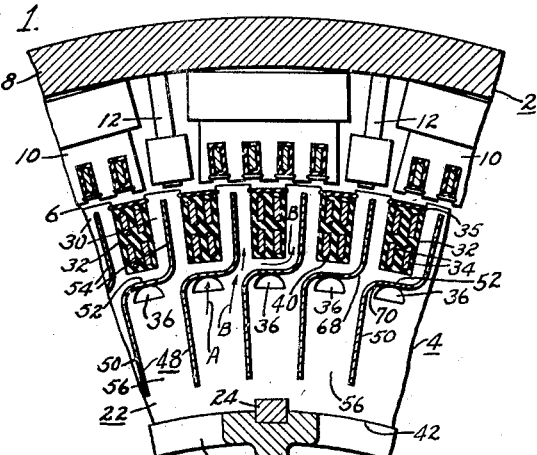
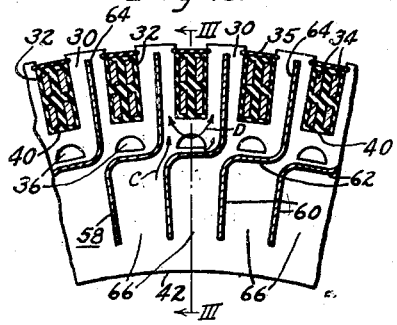
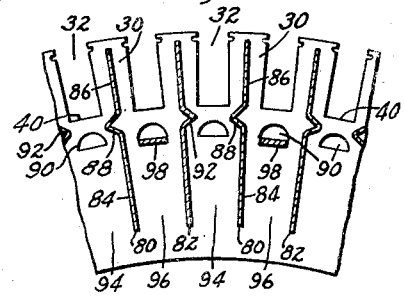
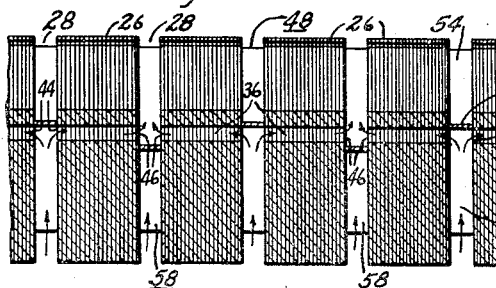
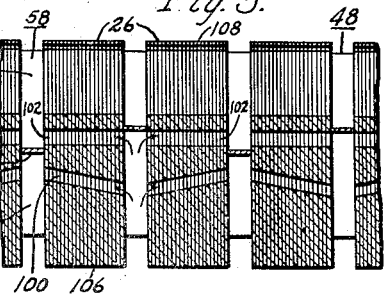
WITNESSES:
Leon M. Garman
Nw. C. Groome
INVENTOR
Clarence Lynn.
BY O. D. Buchanan
ATTORNEY Patented Aug. 7, 1945

2,381,297

UNITED STATES PATENT OFFICE 2,381,297

VENTILATED ELECTROMAGNETIC DEVICE

Clarence Lynn, Pittsburgh 21, Pa., assignor to Westinghouse Electric Corporation, East Pittsburgh, Pa., a corporation of Pennsylvania Application November 18, 1942, Serial No. 465,963

2 Claims. (Cl. 171—252)

My invention relates to an electromagnetic apparatus with special reference to the improving of the ventilation through the magnetic structure thereof; and more particularly relates to dynamo-electric machines having a rotor or stator, or both, comprising a magnetizable core-structure which is formed of a plurality of relatively small core-sections or stacks, each stack usually comprising a number of abutting laminations or punchings, the adjacent stacks being separated by spacing and reinforcing finger-means which also provide radial ventilating ducts.

It is an object of my invention to provide such electromagnetic apparatus, comprising a magnetizable core-structure, with a novel ventilating system which includes means for causing ventilating gas to flow through the magnetizable core-structure in a novel manner.

According to my invention, the relatively small core-sections of the magnetizable core-structure are ventilated by ventilating medium flowing not only along the spaces or ducts between the core-sections but also by ventilating medium flowing substantially longitudinally in ventilating passageways passing crosswise through the core-sections. In electromagnetic apparatus comprising active conductors imbedded in the magnetic core-structure, as for example a rotor of a dynamo-electric machine, the passageways are preferably near the slots which contain the conductors, but not so close as to seriously adversely interfere with the flow of magnetic flux in the core-section, around the conductors.

Another object of my invention is to ventilate a laminated core-structure of a type described in a manner to cause some of the ventilating medium flowing generally outwardly in some of the ducts between laminated core-sections to be diverted into passageways provided by suitable holes in the laminations or punchings of which the core-sections are composed, such diversion being caused by suitable gas-flow baffle-means which deflect a portion of such outwardly flowing ventilating medium into one end of each passageway; by outwardly meaning a flow along the direction in which the ventilating medium flows into the ducts between the core-sections. Additional gas-flow baffle-means at the other ends of the passageways reduce the back-pressure of outflowing gaseous medium thereat, so that the discharge of the ventilating medium from the passageways is not barred. From another aspect, such gas-flow baffle-means at the discharge ends of the passageways may be said to deflect outwardly the ventilating medium flowing out of the passageways.

The cross sectional contour of the passageways may be of any suitable shape and the baffle-means may be provided in any effective manner. However, in my preferred embodiment, the baffle-means is made part of and associated with the spacing or reinforcing fingers between the core-sections which maintain them properly spaced. Adjacent fingers in the same duct may be so disposed and formed that a portion of the gas flowing outwardly between them is forced into the passageways, the relative amount so diverted being dependent, to some extent, on the shape and arrangement of the finger-means.

My invention, which is of general application to electromagnetic structures, is of especial utility for improving the ventilation of dynamo-electric machines so that they can be rated higher, other things being equal. When applied to conductor-carrying rotors of dynamo-electric machines, my invention has the further advantage of permitting longer armature cores to be used because the ventilation of the central core-sections of the core-structure of the rotor can be improved by the provision of my novel ventilating passageways through the core-sections near the conductors. However, in rotors of dynamo-electric machines having a plurality of narrow conductor-containing armature slots and teeth following each other around the outside periphery of the rotor, the teeth generally carry flux of relatively high densities so that it is not, as a rule, desirable to decrease the flux-carrying metal content of the teeth by perforations. In such instances, I prefer to locate the passageways inward of the bottoms of the armature slots.

Many other objects, features and innovations of my invention will be discernible from the following description thereof and the accompanying somewhat brief and schematic drawing, in which like reference numerals designate similar parts, and in which common details are briefly shown or omitted in the interests of clarity and brevity.

In the drawing which is not to scale:

Figure 1 is a sectional view, with parts broken away, of a dynamo-electric machine embodying my invention, the view being on a plane along a radial ventilating duct of the rotor of the machine;

Fig. 2 is a partial sectional view of the rotor of Fig. 1, in a plane along a radial ventilating duct next succeeding (in an axial direction) the radial duct containing the section plane of Fig. 1;

Fig. 3 is a partial, longitudinal, sectional view of the rotor, on the line III—III of Fig. 2, with the conductors omitted for clarity of illustration;

Fig. 4 is a transverse sectional view of a part of a rotor, for illustrating a modified form of my invention; and Fig. 5 is a longitudinal, sectional view of a part of a rotor for illustrating another embodiment of my invention.

While my invention has general application to electromagnetic structures which are ventilated in order to remove heat losses therefrom, I have selected a long-core direct-current dynamo-electric machine such as described in my copending application Serial No. 464,874, filed November 7, 1942, as a convenient apparatus through which to describe preferred forms of my invention, but I desire it to be distinctly understood that my invention is not limited thereto but has broader application.

For the purposes of describing my invention the parts of the dynamo-electric machine shown comprise an outer stator member 2 and an inner rotor member 4 having an outer periphery or side separated from the stator member by an air-gap 6.

The stator member comprises a flux carrying stator frame 8 which supports in alternating relation around its inside periphery a plurality of salient main poles 10 and salient commutating poles 12.

The rotor member 4 comprises a shaft 14 to which is secured an open spider 16 including a plurality of longitudinally and circumferentially spaced spokes or arms 18, the spider having inner rotor air-spaces or passages 20 through which ventilating gas may freely pass along the full length of the spider. An outer core-structure 22 is supported by the spider for rotation therewith through the medium of longitudinal keys 24.

The core structure 22 comprises a plurality of core-sections 26, each of which consists of a number of stacked laminations or punchings; the core-sections being generally annular-like in shape. In an electromagnetic device the number of core-sections may be considerable, the core-sections being separated to provide annular-like radial ventilating passages or ducts 28 between adjacent sections.

The core-sections comprise a plurality of peripheral alternately arranged armature teeth 30 and slots 32, as is customary in apparatus of this kind. The slots of the core-sections are suitably aligned for receiving the active sides or conductors 34 of the armature windings, the conductors being insulated in the slots and wedged therein by wedges 35, each conductor generally extending the length of the core-structure and spanning the ducts between core-sections.

In the manufacture of a magnetizable core-structure of the type described, rigid spacing and reinforcing fingers are placed between adjacent core-sections, which not only maintain the core-sections in proper spaced relation but also provide the radial ventilating ducts such as the ducts 28. Customarily a core-section may have a length of from 2½ to 3 inches and the ducts may have a length of from ¼ to ½ inch, in large dynamo-electric machines. In accordance with a preferred form of my invention such fingers are formed in a special way to cooperate with longitudinal passageways especially provided crosswise in the core-sections so that an improved ventilating system will result.

Referring more particularly to Figs. 1–3 each core-section 26 has a plurality of crosswise passageways 36 extending longitudinally therethrough as referred to the rotor axis and core-structure. These passageways are preferably provided near the armature slots 32 which are places where high heat losses are developed. Preferably a passageway 36 is provided a slight distance inward of the bottom-side 40 of each armature slot 32, being considerably closer to the bottom-side of the armature than to the inner periphery or side 42 of the core-structure; the depth of the core-structure from the bottoms of the slots to this inner side usually being dependent on the main-pole width.

In the forms now being described these passageways 36 are somewhat semi-circular with the curved portion toward the slots, but they may be of any other shape, if desired. Each passageway passes completely through the associated core-section, having end openings at longitudinal consecutive ducts. Since these passageways conduct ventilating air, the inlet end opening is designated herein by the reference numeral 44 and the outlet end opening by the reference numeral 46.

Fig. 1 shows a form of finger 48 used in the alternate ones or every other of the ventilating ducts 28. Each finger comprises an inner generally radially extending finger-portion 50, an intermediate generally circumferentially extending finger-portion 52 and an outer generally radially extending finger-portion 54 which extends along facing teeth of adjacent core-sections. The inner and outer finger-portions 50 and 54 may be either crimped or bent for added strength. The intermediate finger-portion 52 is disposed between the bottom-side 40 of an armature slot and a passageway 36, preferably being closer to the passageway. Each intermediate finger-portion 52 joins the inner and outer finger-portions of a finger, so that, in effect, the associated finger-portion 54 of the same finger 48 is axially aligned with a tooth 30 while the associated inner finger-portion 50 is radially inward from but axially aligned with the next tooth.

In general practice as many fingers 48 are provided as there are teeth in a core-section, so that each radial duct may be considered to be divided into a plurality of generally radial vent-paths 56, a vent-path 56 being bounded by two circumferentially consecutive fingers 48 and the portions of the surfaces of the two adjacent core-sections lying between these fingers. Consequently, there will be as many vent-paths as there are pairs of slots and teeth.

In the remaining or other alternate ducts 28, on each side of the ducts that contain the fingers 48, a different form of finger 58 is utilized which is shown in Fig. 2. These fingers 58 are generally similar to the fingers 48, and comprise an inner finger-portion 60, an intermediate finger-portion 62 and an outer finger-portion 64 dividing the ducts into vent-paths 66. However, the inner and outer finger-portions 60 and 64 of the fingers 58 are relatively shorter and longer than the inner and outer finger-portions of the fingers 48 so that the intermediate finger-portions 62 of the former will be located inwardly of the end openings of the passageways, preferably a short distance inward. Otherwise, the number and disposition of fingers 58 correspond to those of the fingers 48 so that longitudinally along the core-structure the successive ducts 28 are alternately provided with fingers of one form and fingers of the other form.

In the operation of the apparatus thus far described ventilating air is caused to flow into the inner rotor air-spaces 20 in any suitable manner or by any suitable means. This ventilating air passes into the various vent-paths 56 and 66 in the ventilating ducts 28. In the vent-paths 56 formed by the fingers 48, a portion or fraction of the gas flowing therein is caused to enter the inner end openings 44 of the passageways 36 thereat, as shown in Figs. 1 and 3, the intermediate finger-portions 52 acting as baffle-means diverting such air into the passageways, as shown by the arrow A in Fig. 1. The remaining portion of the ventilating air in the vent-paths 56 flows radially outward as indicated by the arrows B in Fig. 1.

As may be observed in Fig. 1 a bent portion 68 of a finger 48, between the intermediate finger-portion 52 and the outer finger-portion 54, and a bent portion 70, between the intermediate finger-portion 52 and the inner finger-portion 50, may be so formed as to somewhat restrict the airflow between bent portions 68 and 70 of two adjacent fingers 48, in order to encourage the flow of ventilating air into the inlet end openings 44 of the passageways 36 thereat.

Obviously these bent portions on the fingers can be designed so as to apportion, in any desired manner, the part of the air which flows through the passageways and the part which flows for the full lengths of the vent-paths, the latter part flowing around the conductors spanning such vent-paths and discharging directly into the airgap 6 without passing through any of the passageways 36.

Air will enter and flow along a vent-path 56, bounded by fingers 48, into two axially adjacent passageways 36 and will then flow in longitudinal opposite directions therein, the air from one passageway discharging into an adjacent receiving duct 28 on one side of the entering duct, and air entering the other passageway discharging into an adjacent receiving duct on the other side, these receiving ducts being provided with the fingers 58 so that air flowing out of the outlet end openings 46 will be diverted radially outward.

Air flowing radially into the vent-paths 66 of the receiving ducts mingles with air flowing out of the passageways 36, the air-flows being respectively indicated by the arrows C and D in Fig. 2; and the mixture is discharged radially into the air-gap 6.

The corresponding passageways 36 in the different core-sections 26 are axially aligned, so that ventilating air flows alternately in opposite directions in the aligned passageways. However, the air flowing in the passageways of any one core-section 26 flows in the same general longitudinal direction. Since the air flowing in the vent-paths 56 is partially diverted into the passageways 36 and the air flowing in the vent-paths 66 has added thereto the air flowing out of the passageways, the sizes of the ducts 28 containing the respective vent-paths may be made respectively different, if desired.

While the embodiment shown in Figs. 1-3 requires an air flow in the same general direction in each core-section, the teachings of my invention can be applied so that air will flow in opposite longitudinal directions in circumferentially different or alternate passageways of a core-section, and Fig. 4 is intended to show briefly such an embodiment. Each duct is provided with circumferentially alternately arranged fingers 80 and 82. Each finger 80 has a substantially radial inner finger-portion 84 and an outer finger-portion 86 joined by a bent intermediate portion 88 bent toward the inlet end-opening of a passageway 90 at one side of the finger, and away from an outlet end-opening of a passageway at the other side of the finger. Fingers 82 are similarly formed, but have bent intermediate portions 92 toward the same passageways 90 toward which the bent portions 88 of the fingers 80 are directed. The fingers 80 and 82 being arranged in alternate sequential circumferential relation in a radial ventilating duct, they provide alternate vent-paths 94 and 96 in each duct, the former being restricted by the bent finger-portions 88 and 92.

Air entering a vent-path 94 will be divided into three portions, a portion entering each passageway 90 associated with the vent-path and the third flowing radially outward between the outer finger-portions of the fingers and around the conductor or conductors spanning such vent-path 94. Along a longitudinal direction the vent-paths 94 in the ducts alternate with vent-paths 96 so that air flowing out of the passageways 90 will flow into vent-paths 96 and thence radially outward. A baffle 98 may be provided to decrease the back pressure at the outlet end-opening of each passageway, this baffle being spaced from the adjacent fingers.

It is obvious that the number of passageways provided in each core-section is subject to wide variation and in Fig. 5 is shown a somewhat modified form of the structure shown in Figs. 1-3, utilizing longitudinally inclined passageways 100 some distance inward of the slots, the core-sections being optionally provided with passageways 102 functioning similar to the passageways 36. Fingers are provided like the fingers 48 and 58 of Fig. 1. In order to provide means for causing a flow of ventilating gas through the passageways 100, they are slanted or inclined outwardly so that the gas-pressure at the inner end-opening of a passageway 100 will be greater than the gas-pressure at its other outer end-opening. This means that the inner end-openings, nearer the side 106 of the core-structure, will be inlet openings while the outer end-openings, nearer the opposite side 108 of the core-structure, will be outlet openings. Preferably the inlet openings are in the ducts having the fingers 48.

While I have shown and described my invention in certain preferred forms and embodiments, it is obvious that the teachings of my invention can be applied in widely different forms and in many different apparatuses of an electromagnetic nature.

I claim as my invention:

1. A magnetizable structure for an electromagnetic device, comprising a plurality of core-sections, a plurality of finger-means for maintaining said core-sections in spaced relation and providing a plurality of transverse ventilating ducts between said core-sections, at least some of said core-sections being provided with intermediate crosswise ventilating passageways, said core-sections having a side provided with alternately arranged teeth and conductor-receiving slots, certain of said finger-means each comprising a portion along a first tooth, a second portion radially inward of a second tooth and a substantially circumferentially extending portion, between the said first and second portions, said circumferentially extending portions of said finger-means being arranged at opposite ends of said passageways, with that at one end of a passageway being radially inward of said one end and that at the other end of such passageway being radially outward of said other end.

2. A magnetizable rotor for an electro-magnetic device said rotor being adapted to rotate about its axis and comprising a plurality of axially spaced substantially parallel magnetic sections and means for maintaining said sections in spaced relation to provide a plurality of ventilating ducts between successive sections, said plurality of sections having sloped internal ventilating passageways extending crosswise therein, between ducts.

CLARENCE LYNN.